United States Patent [19]

Patton

[11] 4,352,905

[45] Oct. 5, 1982

[54] POLYMERS CHARACTERIZED BY 1,3-IMIDAZOLIDINE-1,3-DIYL RINGS PLASTICIZED WITH DIARYL KETONES

[75] Inventor: Tad L. Patton, Baytown, Tex.

[73] Assignee: Exxon Research & Engineering Co., Florham Park, N.J.

[21] Appl. No.: 314,899

[22] Filed: Oct. 26, 1981

[51] Int. Cl.³ .............................................. C08K 5/07
[52] U.S. Cl. .................................... 524/359; 524/357
[58] Field of Search .................. 260/32.8 N; 524/359

[56] References Cited

U.S. PATENT DOCUMENTS 4,206,104 6/1980 Dowbenko et al. ............ 260/32.8 N

Primary Examiner—Joseph L. Schofer
Assistant Examiner—N. Sarofim
Attorney, Agent, or Firm—M. B. Kurtzman

[57] ABSTRACT

Normally intractable polymers of the structure:

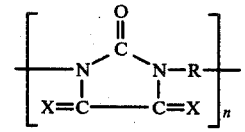

wherein X is O or NH, provided at least one X is O, such as poly(parabanic acids) are made extrudable by composition with from 10 to 60 weight percent of diaryl ketone.

23 Claims, No Drawings

POLYMERS CHARACTERIZED BY 1,3-IMIDAZOLIDINE-1,3-DIYL RINGS PLASTICIZED WITH DIARYL KETONES

BACKGROUND OF THE INVENTION

1. Field of the Invention

The present invention relates to the discovery of a specific class of plasticizers for poly(iminoimidazolidinediones) and poly(parabanic acid) resins.

Related Art

Both the poly(iminoimidazolidinediones) and poly(parabanic acids) and their methods of preparation are known and described in detail in commonly assigned U.S. Pat. No. 3,661,859, which is incorporated in its entirety herein. The poly(parabanic acids) may also be prepared by other processes, such as shown in U.S. Pat. No. 3,609,113.

The poly(iminoimidazolidinediones) may be formed by the reaction of hydrogen cyanide with a diisocyanate or mixture of diisocynates, the reaction of a dicyanoformamide with a diisocyanate or mixtures of diisocyanates, or the polymerization of a cyanoformamidiyl isocyanate and contain a 1,3-imidazolidinedione-1,3-diyl ring of the following structures in the repeat units:

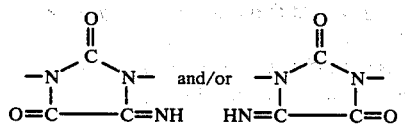

wherein NH is in the 4 or 5 position.

The poly(parabanic acids) also designated as poly(1,3-imidazolidine-2,4,5-triones) may be prepared, for example, by the acid hydrolysis of poly(iminoimidazolidinediones) and contain the imidazolidinetrione ring in the repeat unit:

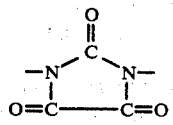

U.S. Pat. No. 3,609,113 and German Pat. No. 1,770,146 describe other methods for preparing polymers which contain the poly(parabanic acid) ring.

The polymers may contain both imino-1,3-imidazolidinedione-1,3-diyl rings and imidazolidinetrione rings, thus the present polymers may be broadly characterized as having the repeating unit:

wherein Q is

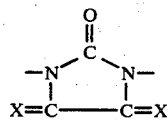

wherein X is O or NH, provided that at least one X is O, R is an organic moiety which may be aliphatic, alicyclic, aromatic or mixtures thereof, and n is sufficiently large to produce a solid product.

The R is the organic moiety of the diisocyanate when the polymer is produced according to the procedure in U.S. Pat. No. 3,661,859. Thus, the diisocyanates may be selected from a broad group having a large variety of organic moieties. The organic moieties of the diisocyanate may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms, (e.g., carboxylic acids, phenols, amines, etc.) should not be present. Specific diisocyanates which may be used are set out in the U.S. Pat. No. 3,661,859, other patents, articles or organic textbooks as known in the art.

Some of the parabanic acid polymers have been found to have high glass transition temperatures, and thus are especially suitable as magnetic tapes (where good dimensional stability at high temperatures is required), films for use in flexible printed circuits, cable wraps, etc., for fibers such as tire cord fibers (where tensile strength and modulus are required), for moldings for electrical connectors, bearings, magnetic wire insulation, coatings for cables, cookware, glass fabrics, industrial belts (where high temperatures are required) and the like.

However, many of the present polymers decompose when they are heated at or above their glass transition temperatures and as a result they can not be molded or extruded. Previously these polymers could be processed only by solution methods or by a powder coating technique which also requires a solvent.

It is an advantage of the compositions of the present invention that the poly(iminoimidazo-lidinediones), poly(imidazolidine-2,4,5-triones) or mixed poly(iminoimidazolidine-1,3-dione/imidazo-lidine-2,4,5-triones) or as defined above the polymers —Q—R]$_n$ may be processes by extrusion and molding techniques, when plasticized according to the present invention. Also films of the compositions of the present invention can be heat-sealed whereas films of the same pure polymers can not be sealed with heat. It is a particular advantage of some of the present plasticizers in that they are not detrimental to polymers which contain small quantities of a copper chelate for thermo-oxidative stability; many other materials investigated as plasticizers do adversely effect the thermal stability.

Various polymeric materials have been plasticized with various aromatic ketones. For example, U.S. Pat. No. 3,300,438 discloses polyvinyl chloride plasticized with methyl substituted benzophenone; U.S. Pat. No. 3,328,336 similarly discloses polyvinyl acetate plasticized with alkylated benzophenone and U.S. Pat. No. 4,184,994 discloses polycarbonates plasticized with ketones. German Pat. No. 2,513,779 discloses dibenzofuran and 9-fluorenone derivatives as plasticizers for plastics. U.S. Pat. No. 4,228,066 discloses the copper chelates of 2-hydroxybenzophenones as UV stabilizers for poly(parabanic acid, in small amounts, of about 0.1 to 3.0 weight % based on the weight of polymer which are too low to permit the 2-hydroxybenzophenones to function as plasticizers.

SUMMARY OF THE INVENTION

Briefly, the present invention is a stable meltable composition comprising heterocyclic polymers characterized in the repeating unit by the tri-substituted 1,3-imidazolidine-1,3-diyl ring:

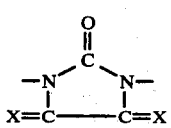

wherein X=0 or NH, provided at least one X is 0 or more specially polymers having the repeating unit:

wherein Q is

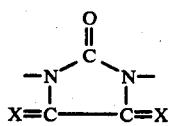

and X has the significance set out above, R is an organic moiety which may be aliphatic, alicyclic, aromatic or mixtures thereof and n is sufficiently large to produce a solid product and a plasticizing amount of solid diaryl ketones.

More particularly, the polymers may be poly(iminoimidazolidinediones) characterized by a tri-substituted 1,3-imidazolidine-1,3-diyl ring of the following structure:

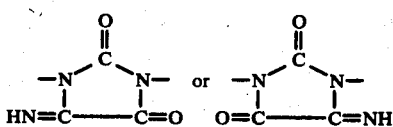

poly(parabanic acids) characterized by a tri-substituted 1,3-imidazolidine-1,3-diyl ring of the following structure:

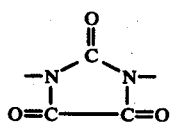

or more specifically, polymers of the general structure:

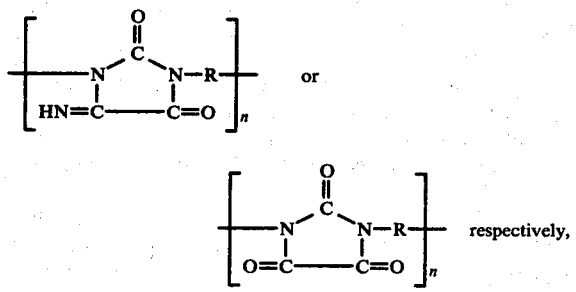

respectively, wherein R and n have the significance given above.

The plasticized compositions of the present invention are capable of being melted without decomposition. The polymers may be films, powders or the like.

The term "plasticizing amount" as used herein means that amount of a designated diaryl ketone (1) which is incorporated in and compatible with the polymer to form a homogeneous composition or (2) which is applied on a surface of the polymer and which will allow the polymer to melt without decomposition. Generally, the plasticizer incorporated into the polymer will comprise from 10 to 50 weight percent of the total weight of polymer and plasticizer, although the plasticizers may be used in slightly smaller amounts, i.e., about 5% and in somewhat larger amounts, e.g., up to about 60%. These compositions may be further characterized as "extrudable". Films of these compositions can be sealed by heating.

DETAILED DESCRIPTION OF THE INVENTION

It was found that conventional plasticizers such as mixtures of N-ethyl-o-toluene sulfonamide and N-ethyl-p toluene sulfonamide and mixtures of o-toluene sulfonamide and p-toluene sulfonamide were not useful for plasticizing the present polymers. Generally, the compositions containing these plasticizers melted but were subject to decomposition at the temperatures required to melt the blends if normal mixing procedures were used, i.e., adequate blending time of the polymer and plasticizer. Those blends which were melted in small batches for only a few minutes exhibited poor thermal stability when heating and mixing were continued.

These problems are substantially overcome by the use of the specified diaryl ketones as plasticizers according to the present invention.

Preferred solid diaryl ketones according to the present invention are those of the structure:

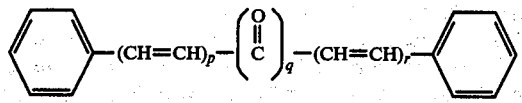

wherein p=0 to 2, q=1 or 2 and r=0 to 2.

An even more preferred class of plasticizers are those where p and r are 0 and q is 1, since these compounds are stable in the presence of conventional UV stabilizers.

The aryl radical of the ketones may have substituents which do not inhibit the plasticizing effect of the material. In particular, substituent groups which have active hydrogen atoms, (e.g., carboxylic acids, phenols, amines, etc.) should not be present. Examples of substitutent groups which do not interfere with plasticizing effect include lower alkyl radicals, up to about 3 carbon atoms halogens, such as bromine, chlorine or fluorine nitro-groups, aryloxy or alkoxy groups, and sulfur containing groups. The substituents may be present on one or both of the aryl radicals. Generally there will be no more than two such substituent groups on each aryl radicals, since substituents which tend to reduce the aromatic character of the ketones will reduce the compatibility of the plasticizer with the polymers.

The presence of a plasticizer in the polymers described herein will, as is the known effect of plasticizers, result in different film properties at elevated temperatures, compared to unplasticized polymer film, that is, polymer films not containing plasticizer. Generally, plasticizers are incorporated in the polymer in amounts of about 10 to 30 weight percent which will lower the softening points of the polymer below those of the unplasticized polymer.

The solid diaryl ketones of this preferred grouping are illustrated by benzophenone, 4,4'-dimethyl benzophenone, benzil (dibenzoyl), chalcone (benzalacetophenone), dicinnamoyl, 1,5-diphenyl-2,4-pentadien-1-one, 1,9-diphenyl-1,3-6,8-nonatetraen-5-one and the like.

The plasticized polymer thus desirably softens at high temperatures so that films of these compositions may be sealed by heat. In the case of the present polymers which have high glass transition temperatures it may not always be desirable to give up the high temperature properties. For example, a cast film is just as easily produced without plasticizers, and may be more easily produced without plasticizers, if solvent removal is hampered by film sag or melting during solvent evaporation.

Films of the present unplasticized polymers are however difficult to heat seal because of their very high softening temperatures, because the polymer does not flow enough to coalesce into a single phase. Moreover, other materials employed in conjunction with the polymer may be damaged by the high temperature required to seal the unplasticized polymer.

Accordingly it has been found that application of a plasticizer described herein as a thin coating to the surface of the unplasticized polymer, such as a film, results in the lowering of the softening point of the treated surface of the polymer to such a degree as to make the film heat sealable. For example, the treated surface may be applied to an untreated surface of the same or different polymeric material and laminated thereto by heat and pressure. This method of heat sealing has a definite advantage over the use of lower melting adhesives, since the melting point of the adhesive may limit the maximum use temperature of the film. This method of heat sealing may also be superior to that wherein the plasticizer is distributed throughout the film because less plasticizer per pound of polymer is required and the heat sealed product will retain its mechanical properties at higher temperatures.

Only one surface of a film to be heat sealed need have the plasticizer applied, that is at least one surface which is to be contacted with another surface must have the plasticizer thereon, however if a coated surface of the present polymer film were placed in contact with the uncoated surface of another film of the present polymer or with its own uncoated surface (as in cable wrapping) the softening point of the polymer in both film surfaces is reduced. The sealing is preferably accomplished by heat and pressure, such that the polymer on both surfaces contacts the plasticizer so that they both soften and coalesce into a single film. Thus, the two films would be joined by fusion. This same procedure has been used to join polymer film to other materials such as copper foil. The thin coating of plasticizer may be applied from a solvent or a melt, to the entire surface to be sealed or to just an edge. The coating is preferably less than 15 mil, more preferably about 0.1 mil thick. Generally, the thickness of such coating will be in the range of about 0.01 to 0.5 mil.

The solution method of applying the coating of plasticizer employs as a solvent any suitable volatile liquid which dissolves the present plasticizer and which does not affect the present polymers. For example, suitable solvents include low molecular weight alkanols having about 1 to 6 carbon atoms, $C_5$ to $C_7$ alkane hydrocarbons, aromatic hydrocarbons having 6 to 8 carbon atoms, halogenated analogues of the above and the like. Such compounds as would be suitable are methanol, ethanol, propanol, 2-butanol, tertiary butanol, 2-3-dimethyl 2-butanol, 2 methyl 2-butanol, 3-pentanol, acetone, methyl ethyl ketone, methyl propyl ketone, butyl methyl ketone, 2-methyl-4-pentanone, methyl acetate, ethyl acetate, isobutyl acetate, isobutyl formate, isopropyl formate, ethyl propionate, isopropyl propionate, pentane, hexane, heptane, toluene, benzene, xylene, naptha, chloroform, carbon tetrachloride, butyl chloride, methylene dichloride, ethyl bromide.

Within the very wide range of useful solvents disclosed, those having a boiling point in the range of 30° to 126° C. are preferred.

The plasticizer is employed in the solvent based on total weight of solvent and plasticizer in an amount in the range of 1 to 90 weight percent and more preferably from 5 to 50 weight percent. The solvent-plasticizer composition is applied to a film by coating it on the desired portion of the film and evaporating the solvent and heating the film to a temperature of 100° to 200° C. (several seconds to 5 minutes). The resultant coated film is not tacky and has substantially the same properties as uncoated film, except for the added property of heat sealability.

To form a heat sealed bond between the present polymer film bearing the coating of plasticizer and itself or a similar film or some other object, the coated surface is applied against the surface to be joined thereto and heat and pressure applied to form the bond.

Generally temperatures in the range of 200° to 300° C. are employed for forming heat seals and more preferably temperatures in the range of 240° to 275° C. are used. Preferably, pressure is applied in conjunction with the heat to facilitate the coalescing of the films. Usually pressures in the range of 1 to 100 psig are used. Conveniently, the pressure is applied by nip rolls, platens or any other conventional means of applying pressure such as the tightness of the film layers against itself on a wrapped wire.

The amount of plasticizer applied by coating as described is generally about 1 to 10 weight percent of the film onto which it is coated, but may be as little as 0.1 weight percent thereof and obtain the described heat sealing or as much as 25 weight percent without detriment. The relative weight of plasticizer to the film is determined in regard to the entire film thickness in the area covered by the plasticizer.

The polymer-plasticizer compositions according to the present invention may be extruded without degradation. The extrusions may be carried out at temperatures in the range of 250° to 330° C. The extrudates of the invention compositions were tough, smooth, clear and yellow to amber colored.

ILLUSTRATIVE PREFERRED EMBODIMENTS

For purposes of illustration, but not for exclusion, the examples illustrating the invention will be described in specific with respect to a particular polymer. That is, a polyparabanic acid prepared from diphenylmethane diisocyanate in accordance with proprietary techniques well described in patents assigned to Exxon Research and Engineering Company to result in a high performance polymer having the repeating unit shown below:

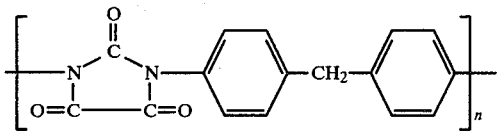

which is also designated as poly[1,4-phenylenemethylene-1,4-phenylene-1,3-(imidazolidine-2,4,5-trione)] which is also designated in chemical abstracts as poly[(2,4,5-trioxo-1,3 imidazolidinediyl)-1,4-phenylenemethylene-1,4-phenylene]. It has a high glass transition temperature of greater than 275° C. and can not be extruded or molded.

For purposes of convenience, this polymer species will be referred to as PPA-M. It will be recognized that other polyparabanic acids (PPA) and their precursors (PIPA) can be prepared from other monomers so that the diphenyl methane group will be replaced by other organic moieties.

In general, the preferred polymers of the polymer-plasticizer compositions are those which have sufficient repeating units at room temperature to be solids.

In addition to the polymer and plasticizers, it is contemplated that other appropriate additives which are not detrimental to the compositions such as those employed to stabilize against oxidation or ultraviolet light, flame retardants, pigments, fillers and the like may be present.

The following examples illustrate the present invention and should not be construed as limiting the scope thereof:

EXAMPLES

The inherent viscosities ($\eta$inh) in these examples were determined in an Ubbelohde tube at 25° C. using a concentration of 0.5 g. of polymer in 100 ml. dimethylformamide.

PPA-M would not melt and could not be extruded under the conditions used in the following examples.

A Brabender extruder on a Plasticorder Prep Center was used for all extrusions. The barrel was ¾ inch in diameter with an L/D ratio of 20:1 and was fitted with a ⅛ inch heated rod die. The barrel was heated in two zones. The screw had 10 flights feed, 5 flights compression, and 5 flights metering; the compression ratio was 3:1. The temperatures of the zones and the screw speed are recorded in the examples.

All polymer powders used in these examples were dry.

EXAMPLE 1

This example demonstrates that aryl ketones render PPA-M melt processable.

Blends composed of 59.5 g. PPA-M and 10.5 g. (15 wt.%) of an aryl ketone were prepared. The ketones were benzil, benzophenone, and 4,4'-dimethyl benzophenone. The blends were heated and mixed in the mixing compartment of a Brabender mixer. The temperature was 290° C. and the rotor speed was 40 rpm.

All 3 blends melted within 2 minutes. The homogenous melts remained stable for at least 30 minutes during which time they were continually kneaded by the rotors in the mixer.

EXAMPLE 2

This example describes the extrusion of two blends, both composed of 150 g. benzophenone in 850 g. PPA-M (15 wt.% plasticizer). One of the blends contained the copper/UV-284 complex (copper salt/chelate of 2-hydroxy-4-methoxy-benzophenone-5-sulfonic acid) stabilizer at concentration of 0.3% based on the weight of PPA-M. The temperature profile in the extruder and rod die was zone 1, 290° C., Zone 2, 285° C., and die, 275° C. The screw speed was 30 rpm. Blend A (no stabilizer) extruded as a clear, light yellow colored, smooth rod at a die pressure of 2700–2900 psi. Blend B (stabilizer present) extruded under the same extruder conditions with no change in die pressure. The extrudate was smooth, clear, and light brown in color. The color change was due to the copper containing stabilizer. The extrudates of both blends were tough and did not break when bent back on themselves. The inherent viscosity of the PPA-M used was 1.0. The inherent viscosities of the extrudates were 0.96 (Blend A) and 0.97 (Blend B). This was evidence that very little molecular weight degradation occurred during extrusion and that the presence of copper/UV-284 had no effect on the inherent viscosity of the polymer. Compare these results with those in Example 3.

EXAMPLE 3

Two blends composed of 150 g. benzil in 850 g. PPA-M were prepared. Blend A did not contain anything else while Blend B contained the copper/UV-284 complex at a concentration of 0.3% based on the weight of PPA-M.

The temperature profile of the extruder was zone 1, 290° C.; zone 2, 280° C., and die (270° C.). The screw speed was 30–60 rpm. The extrudate of Blend A was smooth, light yellow colored and tough; the die pressure varied from 1500–2500 psi as the screw speed was increased from 30 to 60 rpm. When Blend B was extruded under the same conditions the extrudate swelled and foamed, and the die pressure increased to 3800 psi at a screw speed of 60 rpm. The extrudate was brittle; this demonstrates the superiority of benzophenone to benzil as a plasticizer in the presence of the UV stabilizer.

EXAMPLE 4

This example shows that benzophenone is an effective processing aid for the extrusion of PPA-M at a concentration of 10 wt.%.

A blend of 30 g. benzophenone in 270 g. PPA-M was prepared and extruded using a screw speed of 30 rpm. the temperature profile of the extruder was zone 1, 290° C.; zone 2, 290° C.; and die, 270° C. (1) At a die pressure of 6000 psi the extrudate was light yellow colored and slightly rough. (2) At a die pressure of 4000 psi the extrudate was light yellow colored and smooth. Both extrudates were tough and resisted breaking when bent back on themselves. The inherent viscosity (original 0.98) of the polymer was essentially unchanged during extrusion; both had an inherent viscosity of 1.02.

EXAMPLE 5

This demonstrates PPA-M plasticized with dialkyl benzophenone. A blend composed of 45 g. of 4,4'-dimethylbenzophenone in 255 g. PPA-M was prepared. It was extruded through the Brabender extruder using a temperature profile of zone 1, 290° C.; zone 2, 290° C.; and die, 275° C. and screw speeds of 30 to 60 rpm. The die pressure varied from 1000 to 2000 psi. The extrudate was light yellow, smooth and tough, it did not break when bent back in itself. The inherent viscosity (0.95)

was about the same as was before extrusion (original inherent viscosity was 0.98).

EXAMPLE 6

This example demonstrates PPA-M plasticized with chalcone, a vinylog of benzophenone. A blend of 75 g. of chalcone in 425 g. PPA-M was prepared and extruded. The temperature profile of the extruder was zone 1, 290° C., zone 2, 290° C., and die 270° C. The die pressure changed from 1000 to 3000 psi as the screw speed was increased from 30 to 60 rpm. The extrudate was light yellow, smooth, and tough. It did not break when it was bent back on itself. The inherent viscosity of the extrudate was 0.87, slightly less than the original 0.98.

EXAMPLE 7

This example describes the use of aryl ketones as plasticizers which render PPA-M films heat sealable. Films (2 ml thick) were cast from solution which were composed of 2000 g. dimethylformamide (solvent), 500 g. PPA-M, 0.94 g. cupric acetate monohydrate, 1.69 g. UV-284, 0.2 g. Zelec UN (release agent), and 100 g. of an aryl ketone. Then strips (⅜" wide) of each film was wrapped around copper tubing (¼ inch diameter) and placed in an oven heated to 260° C. for 5 minutes. For a control, a film which did not contain an aryl ketone was used. After cooling, the unmodified film unwrapped without assistance. The films which contains the aryl ketone all heat sealed and could not be unwrapped. They slipped off of the copper tubing as a hollow tube. The aryl ketones used were benzophenone, chalcone, and 2,4-dihydroxybenzophenone.

The invention claimed is:

1. A stable meltable composition comprising heterocyclic polymers characterized in the repeating units by the tri-substituted 1,3-imidazolidine-1,3-diyl ring:

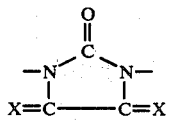

wherein X=0 or NH, provided at least one X is 0 and a plasticizing amount of diarly ketone

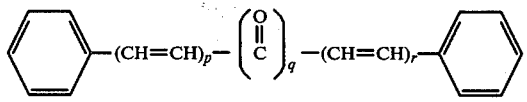

wherein p is 0 to 2, q is 1 or 2 and r is 0 to 2.

2. A stable meltable composition according to claim 1 comprising heterocyclic polymers having the repeating unit:

wherein Q is

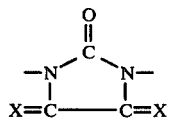

X=0 or NH, provided at least one X is 0, R is an organic moiety which may be aliphatic, alicyclic, aromatic or mixtures thereof and n is sufficiently large to produce a solid product.

3. The stable meltable composition according to claim 2 wherein said plasticizer is present in an amount of from 5 to 60 weight percent based on the total weight of polymer and plasticizer.

4. The stable meltable composition according to claim 3 wherein from 10 to 50 weight percent of plasticizer is present.

5. The stable meltable composition according to claim 1 wherein the aryl radicals have one or more substituents selected from the group consisting of lower alkyl radicals halogens, nitro groups, aryloxy groups, alkoxy group and sulfur containing groups.

6. The stable meltable composition according to claim 1 wherein the plasticizer is benzophenone.

7. The stable meltable composition according to claim 1 wherein the plasticizer is 4,4'-dimethyl benzophenone.

8. The stable meltable composition according to claim 1 wherein the plasticizer is benzil.

9. The stable meltable composition according to claim 1 wherein the plasticizer is chalcone.

10. The stable meltable composition according to claim 2 wherein the polymer has the structure:

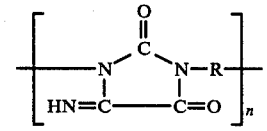

11. The stable meltable composition according to claim 2 wherein the polymer has the structure:

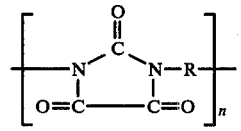

12. The stable meltable composition according to claim 10 or 11 wherein the R group is methylenediphenyl.

13. The stable meltable composition according to claim 10 or 11 wherein the R group is oxydiphenyl.

14. The stable meltable composition according to claim 10 or 11 wherein the R group is a mixture of methylenediphenyl and 2,4-tolylenediyl groups.

15. The stable meltable composition according to claim 10 or 11 wherein the R group is a mixture of methylenediphenyl and bitolyenediyl groups.

16. The stable meltable composition of either claims 10 or 11 wherein said plasticizer is incorporated into said polymer.

17. The stable meltable composition according to claim 16 wherein said polymer is a film.

18. The meltable composition of either claims 10 or 11 wherein said plasticizer is coated onto a surface of said polymer.

19. The stable meltable composition according to claim 18 wherein said polymer is a film.

20. The stable meltable composition according to claim 19 wherein said plasticizer is coated in a thickness of from about 0.01 to 0.5 mil.

21. The stable meltable composition according to claims 10 or 11 containing from about 5 to 60 weight percent of plasticizer based on the total weight of polymer and plasticizer.

22. The stable meltable composition according to claim 21 containing 10 to 50 weight percent of plasticizer on said basis.

23. The stable meltable composition according to claim 16 wherein said polymer is a powder.

* * * * *